United States Patent
Oldroyd et al.

(10) Patent No.: US 9,120,255 B2
(45) Date of Patent: Sep. 1, 2015

(54) COMPOSITE CORE AND METHOD OF MAKING SAME

(71) Applicant: Bell Helicopter Textron Inc., Fort Worth, TX (US)

(72) Inventors: Paul K. Oldroyd, Azle, TX (US); James D. Hethcock, Jr., Colleyville, TX (US); Mark E. Tohlen, Grapevine, TX (US); Phillip A. Kendrick, Fort Worth, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 112 days.

(21) Appl. No.: 13/835,649

(22) Filed: Mar. 15, 2013

(65) Prior Publication Data

US 2014/0265043 A1 Sep. 18, 2014

(51) Int. Cl.
| | | |
|---|---|---|
| *B29C 53/58* | (2006.01) | |
| *B29C 41/08* | (2006.01) | |
| *B29C 70/32* | (2006.01) | |
| *B29C 70/34* | (2006.01) | |
| *B29D 99/00* | (2010.01) | |
| *B29C 53/82* | (2006.01) | |
| *B29C 41/52* | (2006.01) | |
| B29C 33/48 | (2006.01) | |
| B29C 33/52 | (2006.01) | |
| B29L 31/60 | (2006.01) | |
| B29K 105/08 | (2006.01) | |

(52) U.S. Cl.
CPC .............. *B29C 41/085* (2013.01); *B29C 41/52* (2013.01); *B29C 53/821* (2013.01); *B29C 53/828* (2013.01); *B29C 70/32* (2013.01); *B29C 70/345* (2013.01); *B29D 99/0089* (2013.01); *B29C 33/485* (2013.01); *B29C 33/52* (2013.01); *B29K 2105/0872* (2013.01); *B29L 2031/608* (2013.01)

(58) Field of Classification Search
USPC ......... 156/169, 171–173, 184, 185, 187, 188, 156/190, 191, 195
See application file for complete search history.

(56) References Cited

U.S. PATENT DOCUMENTS

| | | | | |
|---|---|---|---|---|
| 3,404,050 A | * | 10/1968 | Gill | 156/53 |
| 4,385,480 A | * | 5/1983 | Burchette, Jr. | 53/399 |
| 2012/0021165 A1 | * | 1/2012 | Hethcock et al. | 428/107 |

FOREIGN PATENT DOCUMENTS

| | | |
|---|---|---|
| DE | 3840788 A1 | 6/1989 |
| JP | S58102727 A | 6/1983 |
| WO | 2011097433 A1 | 8/2011 |

OTHER PUBLICATIONS

European Communication in related European Application No. 13172169.8, dated Jun. 11, 2014, 4 pages.
European Search Report in related European Application No. 13172169.8, dated Nov. 22, 2013, 3 pages.
European Communication in related European Application No. 13172169.8, dated Dec. 9, 2013, 5 pages.
European Communication in related European Application No. 13172169.8, dated Mar. 13, 2014, 3 pages.
European Communication in related European Application No. 13172169.8, dated Aug. 4, 2014, 4 pages.

* cited by examiner

*Primary Examiner* — Carson Gross
(74) *Attorney, Agent, or Firm* — Noah A. Tevis (57) ABSTRACT

A method of wrapping a plurality of mandrels with a composite material can include rotating each mandrel at a rotational speed; translating each mandrel at a translation speed; positioning each mandrel back to back such that an aft face of a preceding mandrel is approximate to a forward face of a trailing mandrel; and sequentially wrapping each mandrel with the composite material in a helical orientation.

11 Claims, 11 Drawing Sheets

COMPOSITE CORE AND METHOD OF MAKING SAME

BACKGROUND

1. Technical Field

The present disclosure relates to a system and method of manufacturing composite core.

2. Description of Related Art

A composite structure, such as a composite honeycomb core, can conventionally be manufactured using a manual process of creating a corrugated pattern in a plurality of composite layers by pressing mandrels against the composite layers. For example, the method described in U.S. Pat. No. 5,567,500, utilizes such a process. The geometry of adjacent composite layers to collectively form the cells of the honeycomb core. Such a process is labor intensive which can make the honeycomb core product very expensive. Further, this manufacturing method can result honeycomb core that is not optimal for various structural implementations.

Hence, there is a need for an improved system and method for manufacturing composite core.

DESCRIPTION OF THE DRAWINGS

The novel features believed characteristic of the system and method of the present disclosure are set forth in the appended claims. However, the system and method itself, as well as a preferred mode of use, and further objectives and advantages thereof, will best be understood by reference to the following detailed description when read in conjunction with the accompanying drawings, wherein:

FIGS. 3-8B are stylized, top, plan views of illustrative fiber configurations of a portion of the core of FIG. 1;

DESCRIPTION OF THE PREFERRED EMBODIMENT

Illustrative embodiments of the system and method of the present disclosure are described below. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

There is a need for an improved core for use in composite sandwich structures.

Therefore, it is an object of the present application to provide an improved core for use in composite sandwich structures.

This and other objects are achieved by a composite core, which includes a plurality of tubes, each of the plurality of tubes comprising a single tow or split tow of fibers wound in a single candy stripe pattern. Adjacent tubes of the plurality of tubes are placed adjacent to one another along sides of the adjacent tubes. A resin is introduced into the preform by a number of means, including vacuum assisted resin transfer molding, resin film infusion, or towpreg.

Another object of the present application allows for the winding angle to be varied in order to provide for the optimum core shear and compression strength. The winding angle can be spaced apart to reduce the amount of material used and provide for a porous core wall with a plurality of small holes.

This and other objects are achieved by a composite core, which includes a plurality of tubes, each the plurality of tubes comprising a plurality of fibers disposed in a polymeric matrix. Adjacent tubes of the plurality of tubes are adhesively bonded, or infused, to one another along sides of the adjacent tubes.

In another aspect of the present application, a method of making a composite core is provided. The method includes the steps of providing a plurality of tubes, each of the plurality of tubes including a plurality of fibers disposed in a polymeric matrix, or subsequently infusing with a polymeric matrix, and adhesively bonding adjacent tubes of the plurality of tubes along sides of the adjacent tubes.

In yet another aspect of the present application, a composite sandwich structure is provided. The composite sandwich structure includes a first skin, a core, and a first adhesive layer adhesively bonded, infused, or otherwise attached to the first skin and a first face of the core. The core includes a plurality of tubes, each the plurality of tubes comprising a plurality of fibers disposed in a polymeric matrix, such that adjacent tubes of the plurality of tubes are adhesively bonded, or otherwise attached to one another along sides of the adjacent tubes.

The present application represents a composite, open-celled core and a method of making the composite core. The core includes a plurality of tubes (i.e., hollow, cylindrical structures) arranged in a two-dimensional array, such that adjacent tubes are adhesively bonded to one another. Each of the tubes comprises a plurality of reinforcing fibers disposed in a polymeric matrix. In one embodiment, at least one of the tubes comprises a plurality of braided fibers disposed in the polymeric matrix. In another embodiment, at least one of the tubes comprises a plurality of fibers formed generally in a helical shape disposed in a polymeric matrix. The tubes may take on many different cross-sectional configurations, such as triangular, square, rectangular, pentagonal, hexagonal, heptagonal, octagonal, or the like. Furthermore, the core may include a combination of tube shapes. For example, the core may include a combination of octagon shaped tubes and square shaped tubes in a geometric pattern.

Figure 1:
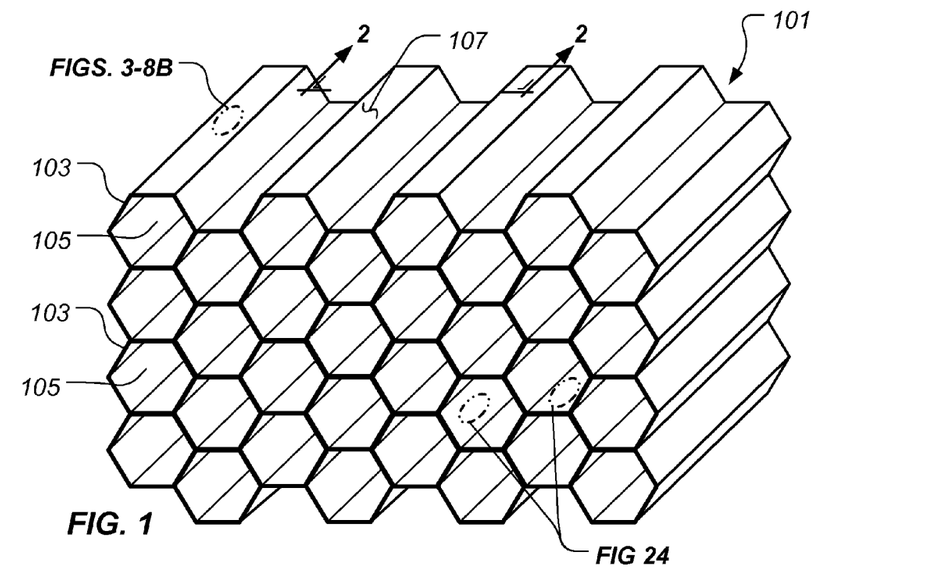
FIG. 1 is a perspective view of an illustrative embodiment of a composite core according to the present application.

FIG. 1 depicts a first illustrative embodiment of a composite, open-celled core 101 according to the present application. Core 101 comprises a plurality of tubes 103 arranged in a two-dimensional array. Note that only two tubes 103 are labeled in FIG. 1 for clarity. Each of tubes 103 defines a passageway or "cell" 105 extending therethrough. Core 101 may comprise any suitable number, size, cross-sectional shape, and construction of tubes 103, as will be discussed in greater detail below.

Figure 2:
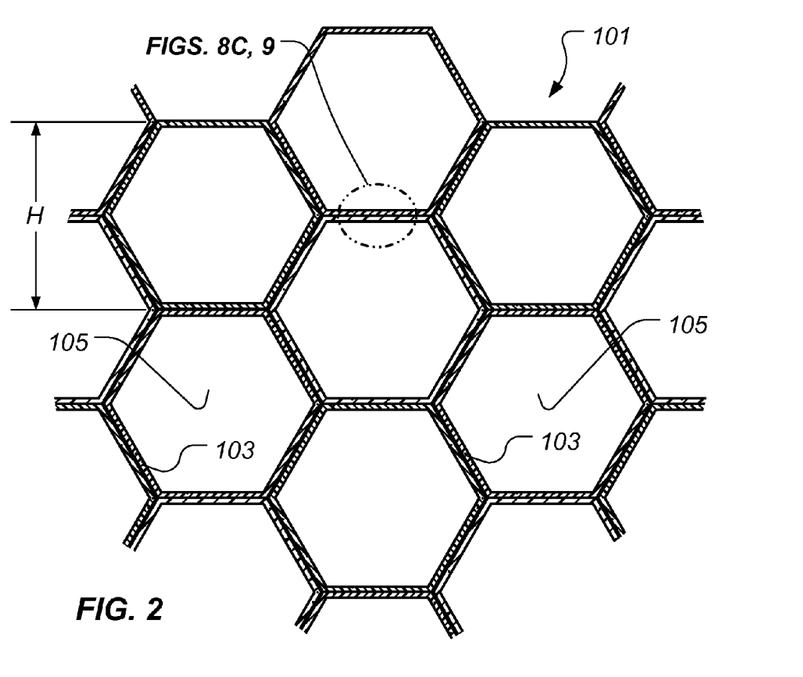
FIG. 2 is an enlarged, cross-sectional view of a portion of the composite core of FIG. 1 taken along the line 2-2 of FIG. 1.

FIG. 2 depicts a cross-sectional view of a portion of core 101 taken along a line 2-2 in FIG. 1. Each of tubes 103 comprises a plurality of reinforcement fibers disposed in a polymeric matrix. For example, tubes 103 may comprise fibers comprising one or more of carbon, graphite, glass, an aromatic polyamide (i.e., "aramid") material, a variant of an aromatic polyamide material (e.g., a polyparaphenylene terephthalamide material, such as Kevlar® by E. I. du Pont de Nemours and Company of Richmond, Va.), or the like. The scope of the present application, however, encompasses fibers comprising any suitable material or combination of materials. The polymeric matrix may comprise any suitable thermoplastic or thermosetting resin. Exemplary resins include epoxy, polyimide, polyamide, bismaleimide, polyester, vinyl ester, phenolic, polyetheretherketone (PEEK), polyetherketone (PEK), polyphenylene sulfide (PPS), and the like.

Figures 3, 4, 5, 6, 7, 8A, 8B:
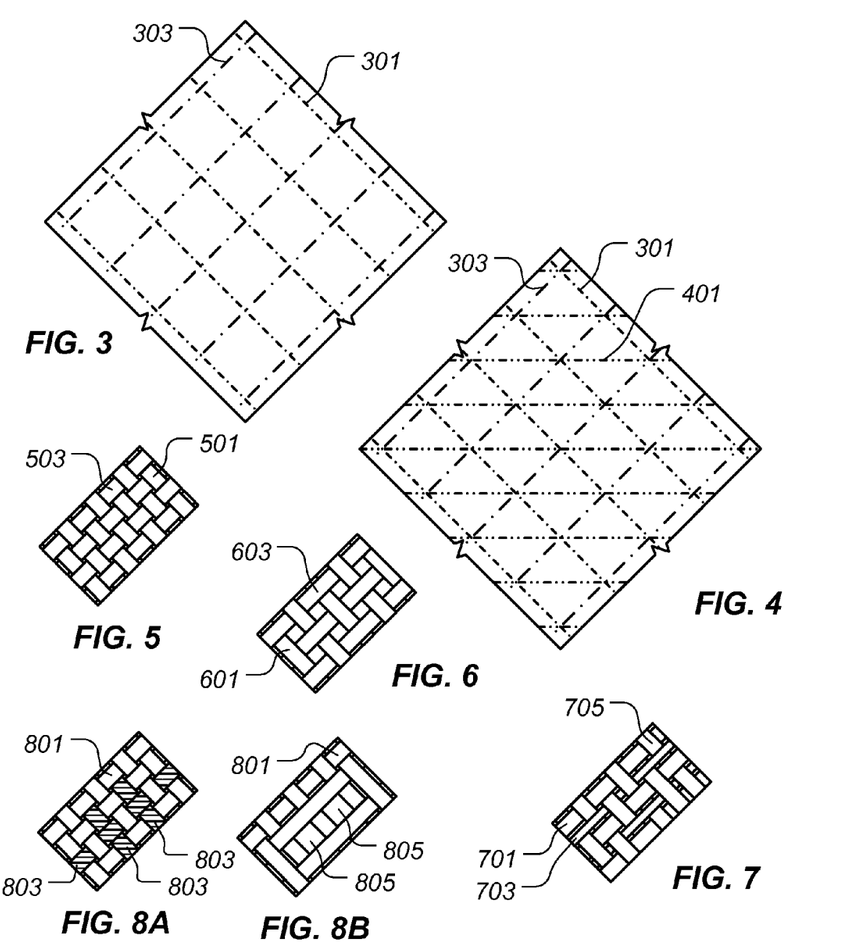

The fibers of tubes 103 may be oriented in one or more directions and may be woven or unwoven. Exemplary embodiments of fiber arrangements of tubes 103 are shown in FIGS. 3-8B. FIG. 3 depicts one illustrative embodiment of a portion of tube 103 indicated in FIG. 1. In the illustrated embodiment, tube 103 comprises a plurality of fibers 301 (only one labeled for clarity) extending in a first direction and a plurality of fibers 303 (only one labeled for clarity) extending in a second direction. It should be appreciated that tube 103 may alternatively only include fibers 301 arranged in a single direction, such as a uniaxial or helical fiber configurations. It should be noted that fibers 301 and 303 are depicted as fiber centerlines. Fibers 301 and 303 are oriented in a biaxial fiber configuration. Fibers 301 overlap fibers 303. In one embodiment, fibers 301 are woven about fibers 303. In another embodiment, fibers 301 are woven about fibers 303 and fibers 303 are woven about fibers 301. In yet another embodiment, a first ply comprises fibers 301 and a second ply comprises fibers 303, such that the second ply is laid-up over the first ply. Alternatively, the first ply comprises one or more of fibers 301 and fibers 303, while the second ply comprises fibers 301 and fibers 303 not present in the first ply. Moreover, the scope of the present application contemplates two or more of fibers 301 to be parts of a single fiber or two or more of fibers 303 to be parts of a single fiber.

FIG. 4 depicts an alternative, illustrative embodiment of the portion of tube 103 indicated in FIG. 1. In the illustrated embodiment, tube 103 exhibits a triaxial fiber configuration, comprising a plurality of fibers 401 (only one labeled for clarity) extending in a third direction in addition to fibers 301 and fibers 303. Note that fibers 301, fibers 303, and fibers 401 are depicted as fiber centerlines. Fibers 401 overlap fibers 301 and fibers 303. In one embodiment, fibers 301 are woven about fibers 303 and fibers 401. In another embodiment, fibers 301 and fibers 303 are woven about fibers 401. In one embodiment, fibers 301 are woven about fibers 303 and fibers 401, while fibers 303 are woven about fibers 301 and fibers 401.

Alternatively, in another embodiment, a first ply comprises fibers 301, a second ply comprises fibers 401, and a third ply comprises fibers 303, such that the second ply is disposed between the first ply and the third ply. It should be noted, however, that the scope of the present application encompasses any suitable arrangement of first, second, and third plies. Moreover, the scope of the present application encompasses the first, second, and third plies comprising any suitable combination of fibers 301, fibers 303, and fibers 401. Furthermore, as in the embodiment of FIG. 3, the scope of the present application contemplates two or more of fibers 301 to be parts of a single fiber or two or more of fibers 303 to be parts of a single fiber.

FIG. 5 depicts one particular illustrative configuration of the portion of tube 103 indicated in FIG. 1. In this embodiment, a plurality of fibers 501 (only one labeled for clarity) extending in a first direction and a plurality of fibers 503 (only one labeled for clarity) extending in a second direction are woven about one another such that only small gaps (e.g., a gap 505) exist between adjacent fibers of fibers 501 and between adjacent fibers of fibers 503. Once tube 103 is cured (i.e., the polymeric matrix has either hardened or crosslinked), the polymeric matrix substantially fills these gaps. Accordingly, fluids are inhibited from passing through the gaps.

In an alternative embodiment, shown in FIG. 6, fibers may be spaced apart so that the polymeric matrix does not fill gaps between the fibers. In the illustrated embodiment, tube 103 comprises a plurality of fibers 601 (only one labeled for clarity) extending in a first direction and a plurality of fibers 603 (only one labeled for clarity) extending in a second direction, such that gaps (e.g., a gap 605) larger than the gaps of FIG. 5 exist between adjacent fibers of fibers 601 and between adjacent fibers of fibers 603. Even after tube 103 is cured, the polymeric matrix does not completely fill the gaps. Accordingly, fluids may pass through the gaps.

It should be noted that certain fibers of tube 103 may differ in size or material than other fibers of tube 103. Moreover, certain fibers may be woven about only certain other fibers or may be woven about groups of two or more fibers. For example, in the embodiment of FIG. 7, the portion of tube 103 indicated in FIG. 1 comprises a plurality of fibers 701 (only one labeled for clarity) extending in a first direction, a plurality of fibers 703 (only one labeled for clarity) extending in the first direction, and a plurality of fibers 705 (only one labeled for clarity) extending in a second direction. Note that fibers 703 are smaller than fibers 701 or fibers 705. In one implementation, fibers 703 comprise a different material than the material of fibers 701 and fibers 705. It should be noted that the scope of the present application encompasses a combination of any number of fiber materials in tube 103. It should also be noted that, in some embodiments, not all of the fibers of tube 103 are individually woven about one another.

It should be noted that the embodiment of FIG. 6 may also be modified to have the configuration of FIG. 7, in that larger gaps exist between adjacent fibers. It should also be noted that one or more of tubes 103 may comprise woven material, such as illustrated in FIGS. 5-8B, in the form of woven fabric, braided sleeves, flat braids, or braided fabric. Moreover, any of the embodiments of FIGS. 5-8B may exhibit a triaxial configuration.

FIGS. 8A and 8B depict one particular illustrative configuration of the portion of tube 103 indicated in FIG. 1. In this embodiment, a plurality of fibers 801 (only one labeled for clarity) extending in a first direction and a second direction are woven with one or more removable bands 803, about one another. Removable bands 803 are configured to be removed in a post cure operation, thus producing gaps 805. For example, removable bands 803 may include a soluble material such that a flushing exposure to water would dissolve and remove bands 803, thereby producing gaps 805 (as shown in FIG. 8B). Removable bands 803 may be introduced in a variety of configurations and quantities, thereby producing selected weave pattern. The configurations of removable bands 803 with plurality of fibers 801 can be selectively chosen to produce gaps 805 and configured for a selected flow rate between and among cells 105 of core 101.

Figure 8C:
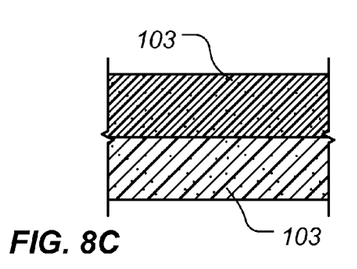
FIGS. 8C and 9 are enlarged, cross-sectional views of certain embodiments of a portion of the core of FIG. 1, as indicated in FIG. 2.
Figure 9:
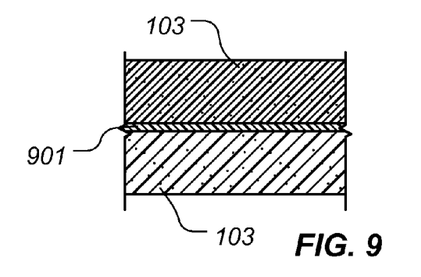

As shown in FIG. 2, adjacent sides of tubes 103 are adhesively bonded, or otherwise attached, to one another to form core 101. FIGS. 8C and 9 depict enlarged views of a portion, indicated in FIG. 2, of core 101. In the embodiment of FIG. 8C, adhesive bonds between tubes 103 are formed by polymeric matrices of adjacent tubes 103. In other words, the polymeric matrix of one tube 103 bonds directly to the polymeric matrix of an adjacent tube 103. Fibers in one tube 103 are crosslinked with fibers of adjacent tube 103, which is further described in regard to FIG. 24. Alternatively, as depicted in FIG. 9, adhesive bonds between tubes 103 are provided by an adhesive layer 901 disposed between tubes 103.

Returning to FIG. 2, tubes 103 exhibit any desired cross-sectional height H. For example, core 101 may include tubes 103 having a height H of about six millimeters or may include tubes 103 that have the height H of about 50 millimeters. The scope of the present application, however, is not limited by these exemplary heights H. Rather, core 101 may comprise tubes 103 having any desired size, e.g., height H. Moreover, core 101 may comprise different sized tubes 103. In other words, core 101 may comprise one or more tubes 103 having sizes that are different from one or more other tubes 103. For example, core 101 may comprise tubes 103 having different heights H.

Figure 10:
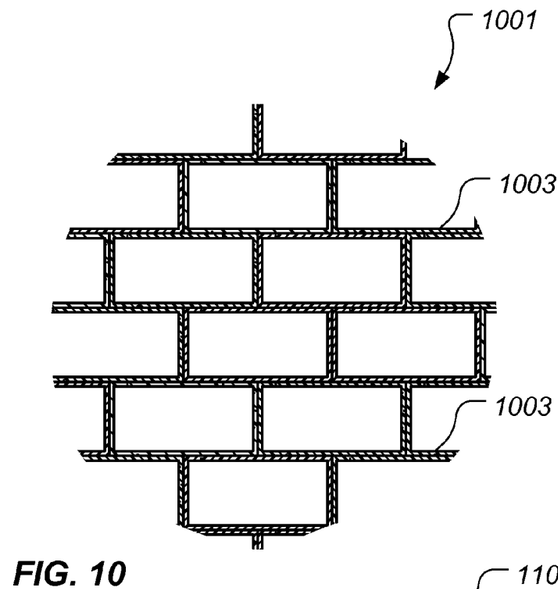
FIG. 10 is a cross-sectional view of an illustrative embodiment, alternative to that of FIG. 2, of a composite core according to the present application.

Tubes 103 of the embodiment illustrated in FIGS. 1 and 2 exhibit hexagonal cross-sectional shapes. The scope of the present application, however, is not so limited. Rather, a core of the present application may comprise tubes having any shape suitable for the implementation of the core. For example, as shown in FIG. 10, a core 1001 comprises a plurality of rectangular tubes 1003. Note that only two tubes 1003 are labeled in FIG. 10 for clarity. As in the previous embodiment, adjacent tubes 1003 are adhesively bonded, or otherwise attached, to one another. Other aspects of tubes 1003 generally correspond to the aspects of tubes 103 discussed above and shown in FIGS. 1-9.

The core of the present application, such as core 101 (shown in FIGS. 1 and 2) and core 1001 (shown in FIG. 10), may be produced using any suitable method. It should be noted that, while the particular manufacturing embodiments discussed below and illustrated in the drawings are directed to the manufacture of core 101, the embodiments apply equally to the manufacture of core 1001 or any other core encompassed within the scope of the present application.

Figure 11:
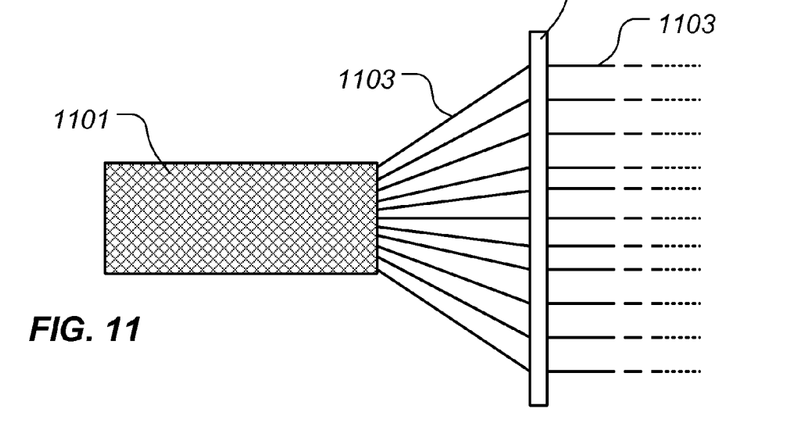
FIG. 11 is a stylized, side, elevational view of a sleeve of the present application being braided, illustrating one particular embodiment of a method according to the present application for making the sleeve.
Figure 12:
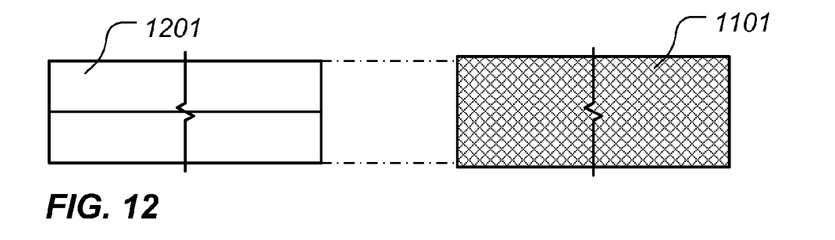
FIG. 12 is a stylized, side, elevational view of the sleeve of FIG. 11 being placed on a mandrel, further illustrating the method of FIG. 11 of making the sleeve.

In one embodiment, shown in FIG. 11, tube 103 (shown in FIGS. 1 and 2) is made by braiding a sleeve 1101 of fibers 1103 (only one labeled for clarity) using a braiding machine 1105. Sleeve 1101 may comprise, for example, a biaxial arrangement of fibers 1103 or a triaxial arrangement of fibers 1103, as discussed above. Fibers 1103 may comprise dry fibers or resin-coated fibers, such as fibers coated with a thermoplastic resin. As shown in FIG. 12, sleeve 1101 is place over a mandrel 1201 after sleeve has been braided. Note that, in the illustrated embodiment, mandrel 1201 exhibits a size and shape corresponding to cell 105 (see FIG. 1 or 2). Mandrel 1201 and sleeve 1101 are subsequently assembled with other mandrels and sleeves, as will be discussed in greater detail below, to form core 101 (shown in FIG. 1).

Figure 13:
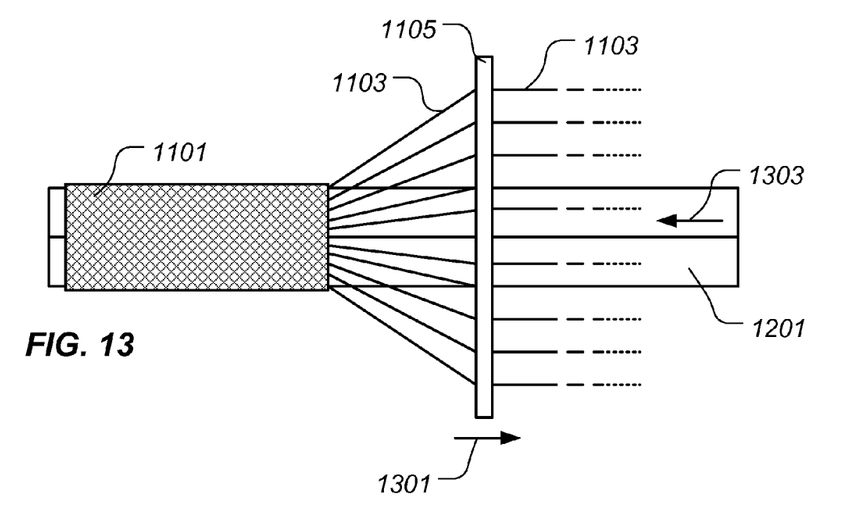
FIG. 13 is a stylized, side, elevational view of a sleeve of the present application being braided onto a mandrel, illustrating one particular embodiment of a method, according to the present application, for making the sleeve.

It should be noted that, as shown in FIG. 13, sleeve 1101 may be braided directly onto mandrel 1201. In such an embodiment, fibers 1103 are secured to mandrel 1201, if only frictionally, prior to braiding sleeve 1101. Braiding machine 1105 may be advanced along mandrel 1201, as indicated by an arrow 1301, as sleeve 1101 is braided. Mandrel 1201 may be advanced with respect to braiding machine 1105, as indicated by an arrow 1303, instead of or in addition to braiding machine 1105 being advanced along mandrel 1201.

Figure 14:
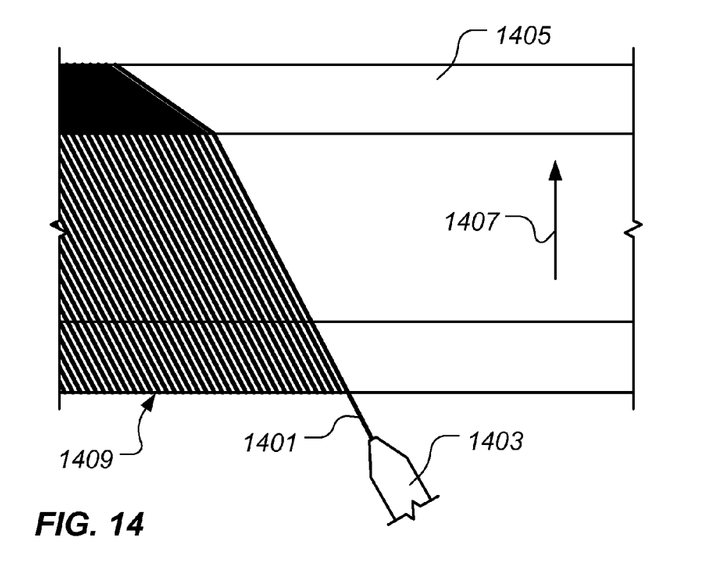
FIG. 14 is a stylized, top, plan view of an illustrative embodiment of a composite core tube of the present application being made using a filament winding process, illustrating one particular method, according to the present application, for making the composite core tube.

In another embodiment, shown in FIG. 14, tube 103 (shown in FIGS. 1 and 2) is made using a filament winding process. A continuous, resin-impregnated fiber 1401, extending from a filament winding machine 1403, is wound about a mandrel 1405. The resin can be either a thermosetting or thermoplastic resin and becomes the polymeric matrix of tube 103 upon curing tube 103. The material placement process may be conducted in a variety of processes; however, it is preferred that the mandrel 1405 moves axially while a spool of fiber 1401 rotates around the mandrel 1405, as indicated by an arrow 1407. Alternatively, a spool or a plurality of spools of material could rotate around the mandrel. Relative motion of the material dispensing mechanism to the mandrel is inferred. As fiber 1401 is wound onto mandrel 1405 by filament winding machine 1403, a helical shaped pattern is formed. One or more plies 1409 of fiber 1401, in desired orientations with respect to mandrel 1405, are wound onto mandrel 1405 to form tube 103. The angle of which fiber 1401 is wound about mandrel 1405 may vary along the length of the mandrel 1405 in order to customize the strength of the core. For example, the angle of the fiber 1401 may be dynamically changed during the material placement process in order to customize a compressive strength of the core. Note that, in the illustrated embodiment, mandrel 1405 exhibits a size and shape corresponding to cell 105 (see FIG. 1 or 2). It should be further noted, however, that the present application is not limited to the particular illustrated configurations of filament winding machine 1403 or mandrel 1405. Mandrel 1405 and the one or more plies 1409 that have been filament wound onto mandrel 1405 are subsequently assembled with other mandrels and plies, as will be discussed in greater detail below, to form core 101 (shown in FIG. 1). It should further be appreciated that upon cutting of plies 1409 and the mandrel 1405, the material may have a tendency to un-wind. A band of material, potentially adhesive or fibrous, may be used to keep fiber 1401 from unraveling upon cutting of the plies 1409 and the mandrel 1405. An adhesive material with unidirectional fibers could be used to band the fiber 1401 on mandrel 1405 and remain compatible with the base material.

Figure 15:
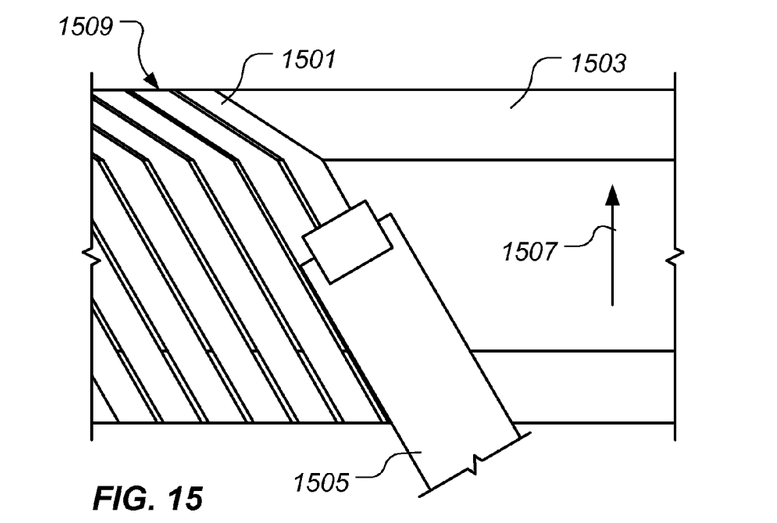
FIG. 15 is a stylized, top, plan view of an illustrative embodiment of a composite core tube of the present application being made using a fiber placement process, illustrating one particular embodiment of a method, of the present application, for making the composite core tube.

In yet another embodiment, shown in FIG. 15, tube 103 (shown in FIGS. 1 and 2) is made using a fiber placement process. A continuous, resin-impregnated tow 1501 (only one labeled for clarity) of approximately 1000 fibers is applied to a mandrel 1503 by a fiber placement machine 1505. It should be appreciated that tow 1501 may also be portions of a full tow; for example, tow 1501 may be a half tow of 500 fibers. In lieu of a tow 1501, a tape of fibers, cut to a prescribed width, may be used. A pre-cut tape of fibers may be referred to as a "slit-tape." A slit-tape allows the user to more closely control the width dimension, as compared to a tow of fibers. Exemplary prescribed widths of slit-tape include ⅛" and ¼", to name a few. The resin can be either a thermosetting or thermoplastic resin and becomes the polymeric matrix of tube 103 upon curing tube 103. During the fiber placement process, mandrel 1503 moves axially while tow 1501 rotates around the mandrel 1503, as indicated by an arrow 1507. As tow 1501 is applied to mandrel 1503 by fiber placement machine 1505, a helical shaped pattern is formed. One or more plies 1509 of tow 1501, in desired orientations with respect to mandrel 1503, are wound onto mandrel 1503 to form tube 103. It should be appreciated that more than one tow 1501 of different materials may be used. Note that, in the illustrated embodiment, mandrel 1503 exhibits a size and shape corresponding to cell 105 (see FIG. 1 or 2). It should be further noted, however, that the present application is not limited to the particular illustrated configurations of fiber placement machine 1505 or mandrel 1503. Mandrel 1503 and the one or more plies 1509 that have been fiber placed onto mandrel 1503 are subsequently assembled with other mandrels and plies, as will be discussed in greater detail below, to form core 101 (shown in FIG. 1).

Figure 24:
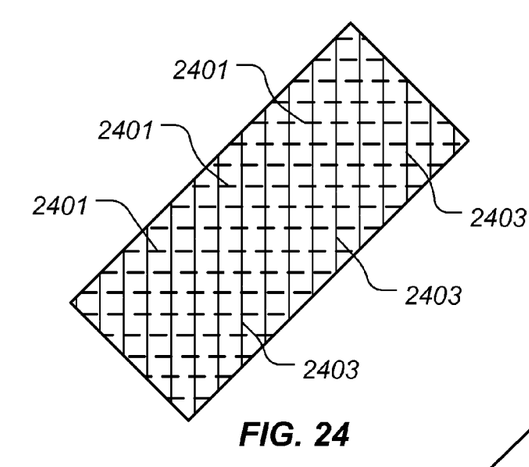
FIG. 24 is a stylized, top, plan view of illustrative fiber configuration of a portion of the core of FIG. 1.

It is important to note that adjacent tubes 103, as best shown in FIG. 1, are located so that fibers in a first tube 103 crosslink with fibers in an adjacent tube 103 where adjacent tubes 103 contact each other, as shown in FIG. 8C. Referring to FIG. 24 as an illustrative embodiment, fibers 2401 are represented as dashed lines in order to clarify that fibers 2401 are from a tube 103 adjacent to another fibers 2403 of another tube 103, as shown in FIG. 1. It should be appreciated that fibers 2401 and 2403 may be actual individual fibers, or centerlines for a plurality of fibers, such as fibers in tow 1501. In the example shown in FIG. 24, tubes 103 are created by winding fibers about a mandrel at an angle (such as mandrels 1405 and 1503) as shown in FIGS. 14 and 15. Fibers 2401 and 2403 are each wound about a different mandrel, but in a similar orientation. However, when mandrels are placed together in a mold, as shown in FIG. 18, fibers 2401 and 2403 are oriented to each other in a crosslinking pattern. For example, when fibers 2401 and 2403 are each wound about a mandrel at a same direction and a same 45 degree angle, then fibers 2401 and 2403, of adjacent tubes 103, actually have a 90 degree crosslinking orientation to each other. It should be appreciated that multiple mandrels having similarly oriented wound fibers are assembled adjacently, without changing the orientation of the mandrels, so as to produce crosslinking of fibers in adjacent tubes 103. After curing, crosslinked fibers 2401 and 2403 provide strength to core 101. It should be appreciated that fibers 2401 and 2403 of adjacent tubes 103 can be wound about a mandrel in a variety of orientations; for example, fibers 2401 and 2403 may be wound about a mandrel at 30 degree orientations such that fibers 2401 and 2403 are crosslinked at 120 degree orientations to each other. It should also be appreciated that fibers 2401 and 2403 may be braided, instead of being wound, onto mandrels in a variety of patterns; nevertheless, fibers 2401 and 2403 of adjacent tubes 103 become further crosslinked during processing. An exemplary method of processing multiple adjacent tubes 103 to form core 101 is described in relation to FIGS. 17-20.

Figure 16:
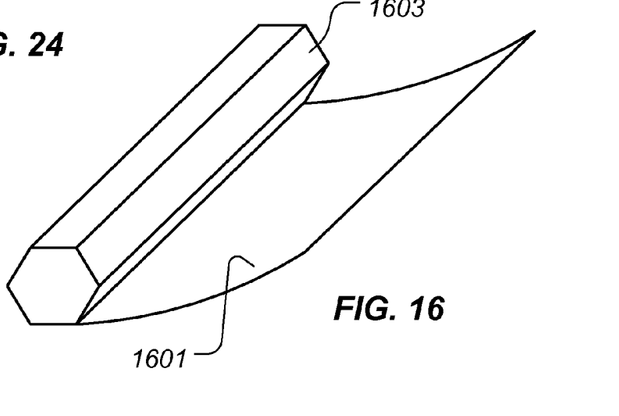
FIG. 16 is a stylized, perspective view of an alternate method, according to the present application, for making a composite core tube of the present application.

Alternatively, tube 103 (shown in FIGS. 1 and 2) may be made using manual, hand-layup methods. For example, as shown in FIG. 16, one or more plies 1601 having desired fiber orientations are applied onto a mandrel 1603 to form tube 103. The one or more plies 1601 may comprise woven dry fibers, unwoven dry fibers, resin-impregnated woven fibers, or resin-impregnated unwoven fibers. Note that, in the illustrated embodiment, mandrel 1603 exhibits a size and shape corresponding to cell 105 (see FIG. 1 or 2). It should be further noted, however, that the present application is not limited to the particular illustrated configurations of the one or more plies 1601 or mandrel 1603. Mandrel 1603 and the one or more plies 1601 that have been applied onto mandrel 1603 are subsequently assembled with other mandrels and plies, as will be discussed in greater detail below, to form core 101 (shown in FIG. 1).

Figure 17:
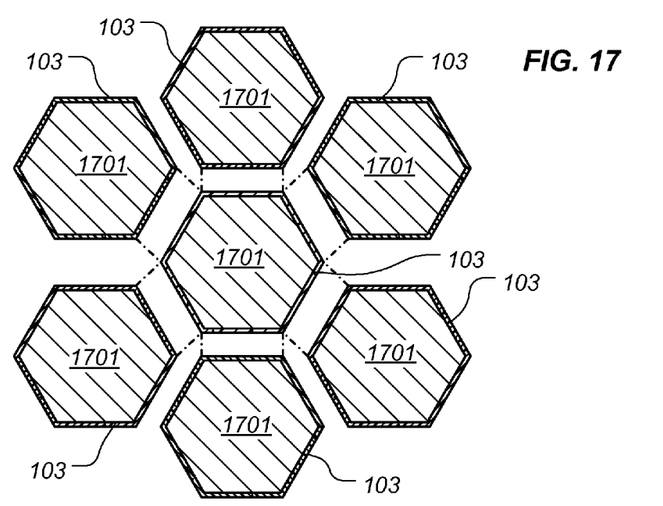
FIG. 17 is a stylized, exploded, cross-sectional view of a plurality of mandrels and composite core tubes as assembled for processing the plurality of composite core tubes into a composite core of the present application.
Figure 18:
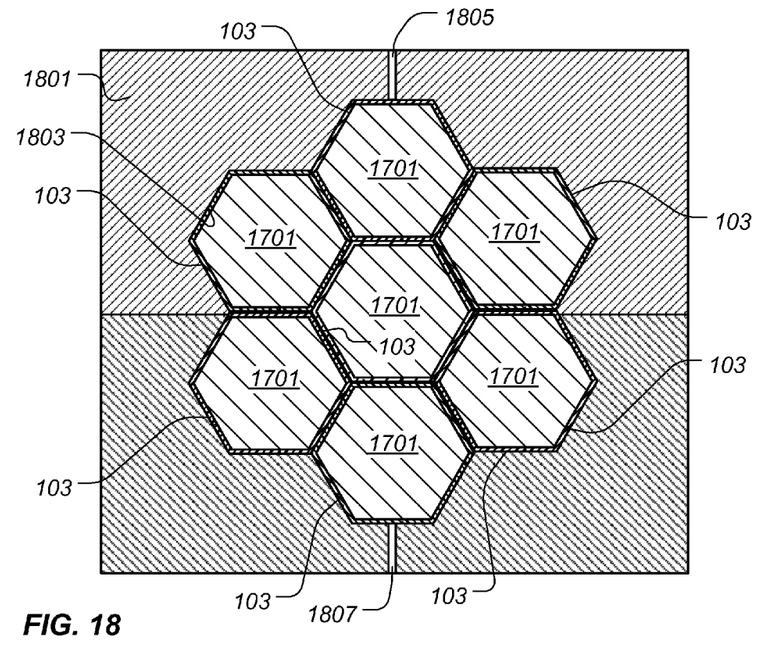
FIG. 18 is a stylized, cross-sectional view illustrating one particular embodiment of a method for processing a plurality of composite core tubes into a composite core of the present application.

As shown in FIG. 17, a plurality of mandrels 1701 (corresponding to mandrels 1201, 1405, 1503, 1603, or the like) and tubes 103 are assembled together to form the basis for core 101 (shown in FIG. 1). Note that the plurality of mandrels 1701 and tubes 103 may include any suitable number of mandrels 1701 and tubes 103 in any suitable configuration to form core 101. In one embodiment, shown in FIG. 18, the plurality of mandrels 1701 and tubes 103 are assembled together in a mold 1801. Note that mold 1801 is not limited to the configuration depicted in FIG. 18 but may take on any suitable configuration. An inner surface 1803 of mold 1801 has the form of an exterior surface 107 (see FIG. 1) of core 101.

In one embodiment, tubes 103 comprise a thermosetting polymeric matrix that is cured prior to assembling mandrels 1701 and tubes 103 into mold 1801. In such an embodiment, adhesive layer 901 (shown in FIG. 9) is applied between adjacent tubes 103 prior to assembling mandrels 1701 and tubes 103 into mold 1801. In another embodiment, tubes 103 comprise a thermoplastic polymeric matrix or comprise a thermosetting polymeric matrix that is not cured prior to assembling mandrels 1701 and tubes 103 into mold 1801. In such an embodiment, adhesive layer 901 may be applied between adjacent tubes 103 prior to assembling mandrels 1701 and tubes 103 into mold 1801, but is not required.

If fibers pre-impregnated with polymeric resin are used in tubes 103, heat and, in some embodiments, pressure is applied to tubes 103 after mandrels 1701 and tubes 103 have been assembled into mold 1801. If tubes 103 are not cured prior to assembly into mold 1801, the applied heat cures tubes 103. If adhesive layers 901 are used to adhesively bond adjacent tubes 103, the applied heat melts and cures adhesive layers 901.

If dry fibers are used in tubes 103, in one embodiment, a thermoplastic or thermosetting polymeric resin is introduced about the dry fibers via one or more ports 1805, 1807. The polymeric resin becomes the polymeric matrix of tubes 103. Processes such as resin transfer molding, vacuum-assisted resin transfer molding, or the like can be used to accomplish the introduction of the polymeric resin about the dry fibers. Heat and, in some embodiments, pressure is applied to tubes 103 to cure the polymeric resin.

After the adjacent tubes 103 are adhesively bonded to one another to form core 101, mandrels 1701 are removed from tubes 103. In one embodiment, mandrels 1701 are merely withdrawn from tubes 103. In other embodiments, however, mandrels 1701 are dissolved, for example, by heat or a solvent. In one embodiment, mandrels 1701 are water soluble and, thus, water is used to dissolve mandrels 1701. In the embodiment wherein the mandrel is dissolvable, the mandrel may remain the core to aid in stabilizing the core during machining of the core. The mandrel may also remain inside the core after machining and during the processing and curing of the core to the skins in order to stabilize the core during the processing and curing. Next, the mandrel could be dissolved with water, or removed through a similar means. It should be appreciated that the mandrels can also be comprised of several layers, including an outside soluble material that remains with the core, and an inside metal material that is removed after the core is processed.

Figure 19:
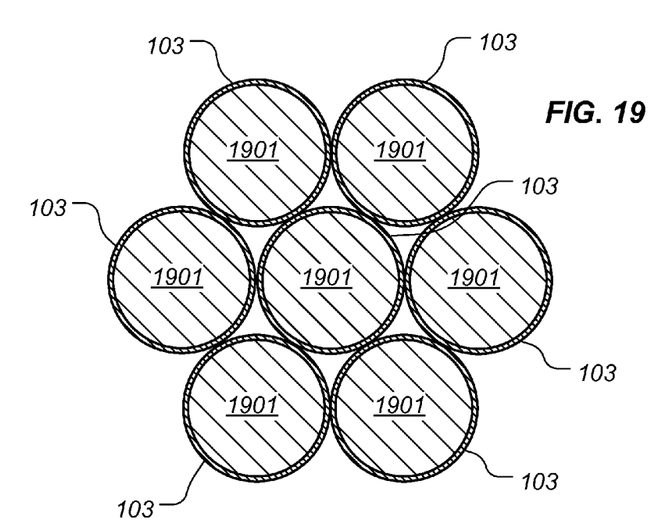
FIG. 19 is a stylized, exploded, cross-sectional view of a plurality of expandable mandrels and composite core tubes as assembled for processing the plurality of composite core tubes into a composite core of the present application.
Figure 20:
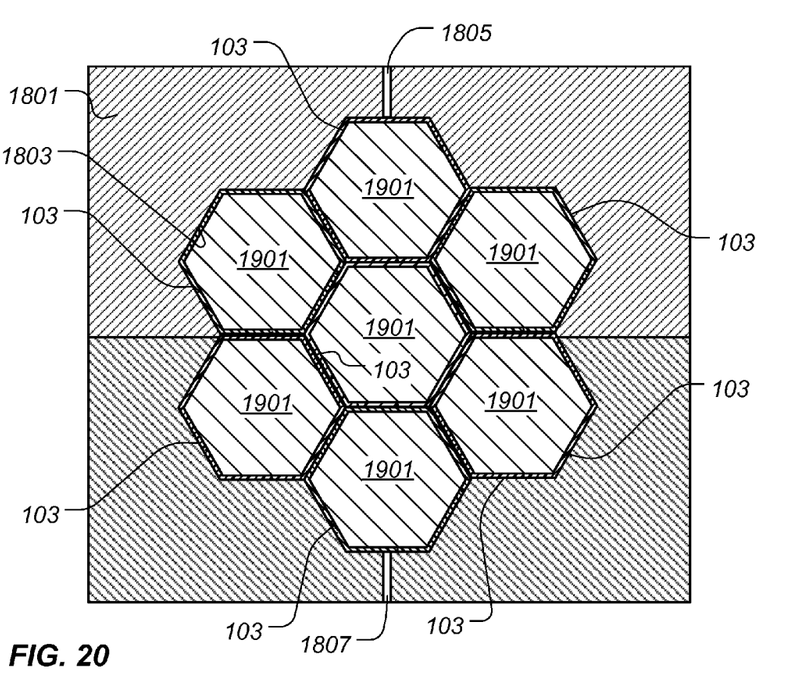
FIG. 20 is a stylized, cross-sectional view illustrating one particular embodiment of a method for processing a plurality of composite core tubes in expandable mandrels, into a composite core of the present application.

FIGS. 19 and 20 represent another illustrative embodiment a mandrel 1901 used to create core 101. An expandable mandrel 1901 may be used such that tubes 103 are formed on expandable mandrels 1901 for formation of core 101. Expandable mandrel 1901 is preferably constructed of a material that expands in volume when subjected to heat, or any other catalyst that would tripper volumetric expansion. Expandable mandrels 1901, with tubes 103, are then stacked and arranged in a selected pattern while in their pre-expanded state, as shown in FIG. 19. Expandable mandrels 1901 are preferably confined in a mold 1801 such that volumetric expansion of expandable mandrels 1901 forces tubes 103 to formed to a specified shape and pattern. The pattern shown in FIGS. 19 and 20 is merely exemplary of a variety of shapes and patterns to which expandable mandrels 1901 can be arranged. For example, mandrels 1901 can be stacked directly adjacent, above, and below so as to form tubes 103 into a square shape. One exemplary advantage of expandable mandrels 1901 is that a variety of core 101 shapes can be manufactured from a single sized mandrel. In addition, it is simpler to wind fibers onto a round mandrel versus a multi-faceted mandrel.

Figure 21:
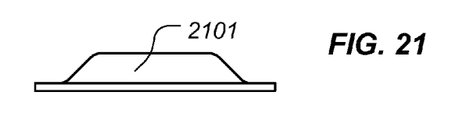
FIG. 21 is a stylized, side, elevational view of an illustrative embodiment of a composite sandwich structure according to the present application.
Figure 22:
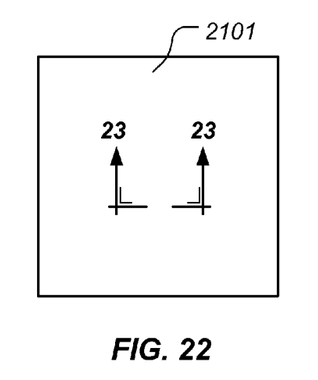
FIG. 22 is a stylized, top, plan view of the composite sandwich structure of FIG. 21.
Figure 23:
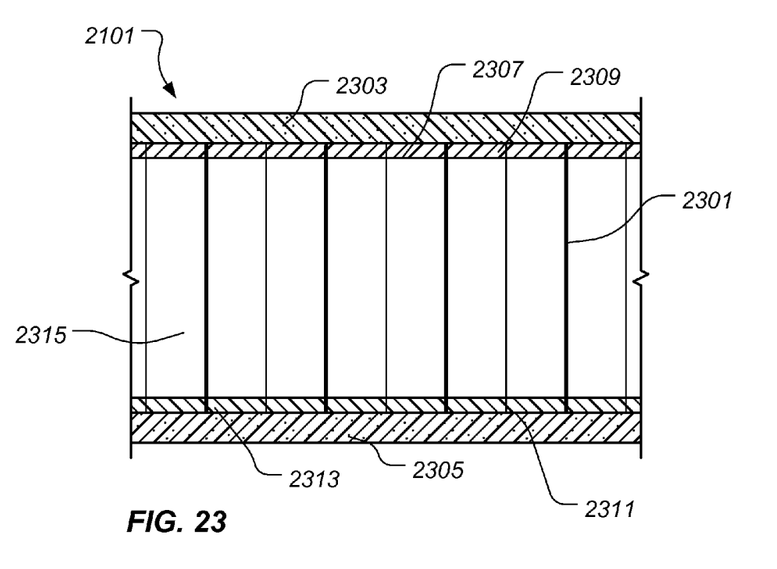
FIG. 23 is a cross-sectional view of the composite sandwich structure of FIG. 21, taken along the line 23-23 in FIG. 22.

The scope of the present application encompasses a composite sandwich structure comprising a core of the present application. For example, FIGS. 21 and 22 illustrate a side, elevational view and a top, plan view, respectively, of a composite sandwich structure 2101 according to the present application. As shown in FIG. 23, which is a cross-sectional view of a portion of composite sandwich structure 2101, composite sandwich structure 2101 comprises a core 2301 disposed between an upper skin 2303 and a lower skin 2305. Upper skin 2303 is adhesively bonded to an upper face 2307 of core 2301 by a first adhesive layer 2309. Lower skin 2305 is adhesively bonded to a lower face 2311 by a second adhesive layer 2313. It should be noted that, in various embodiments, one of upper skin 2303 and lower skin 2305 may be omitted.

In one embodiment, adhesive layers 2309, 2313 extend substantially only between core 2301 and skins 2303, 2305, respectively. In other words, adhesive layers 2309, 2313 are omitted over open cells 2315 of core 2301. This configuration is accomplished, in one embodiment, by concentrating adhesive on the edge surfaces of the core through a reticulation process.

Figure 25:
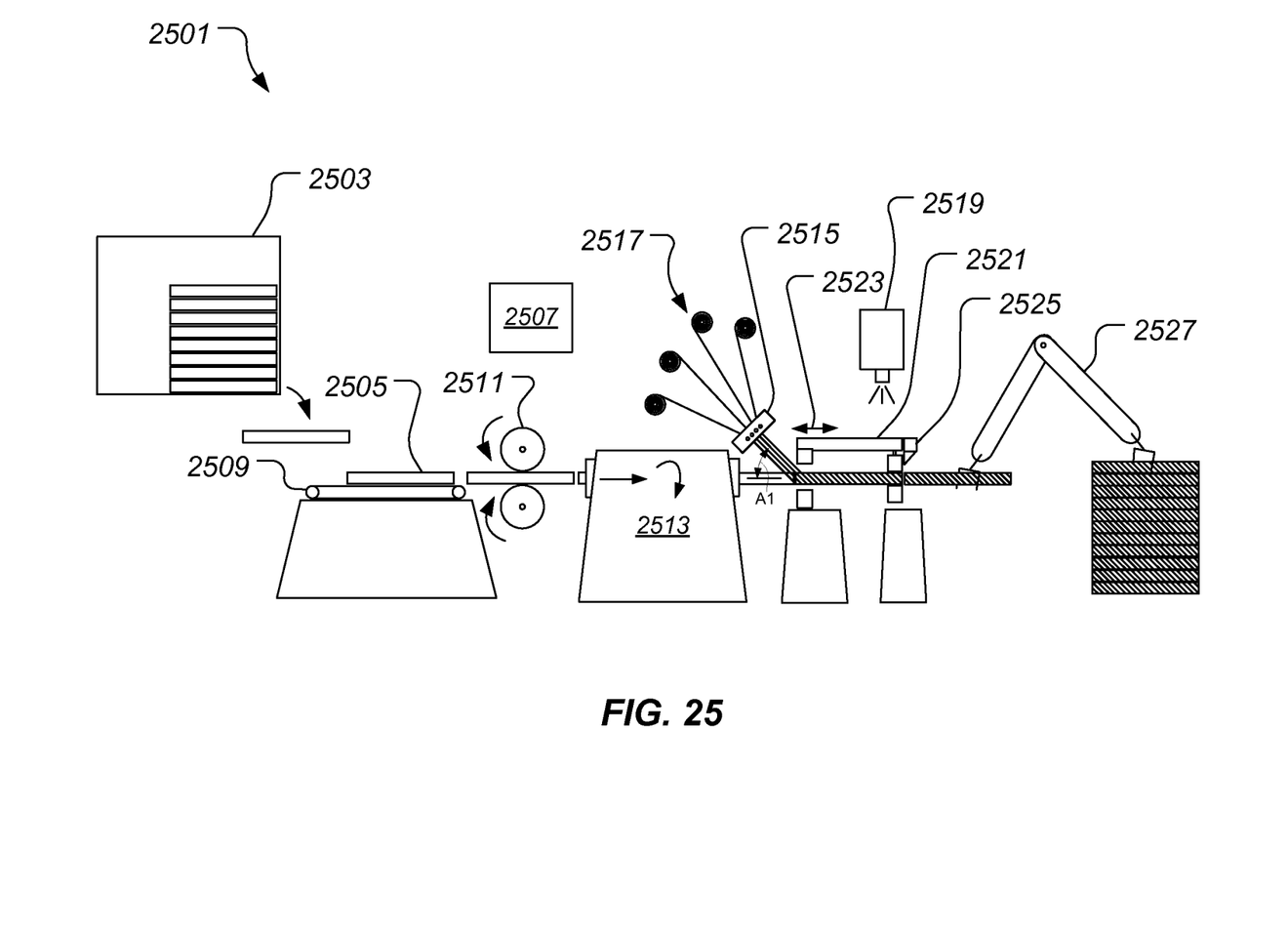
FIG. 25 is a schematic view of system for wrapping mandrels for the production of composite core, according to one example embodiment.

Referring now to FIG. 25, a system 2501 configured for wrapping mandrels with composite material is illustrated. A mandrel 2505 is exemplary of mandrels discussed further herein, such as mandrels 1405 and 1503. System 2501 is an efficient and cost effective tool for wrapping a plurality of mandrels 2505 with composite material for the fabrication of composite core, such as composite core 101 illustrated in FIG. 1.

System 2501 can include a controller 2507 configured to control and synchronize one or more functionalities within system 2501. A hopper 2503 is configured to house and selectively deploy mandrels 2505. A conveyor 2509 can translate mandrels 2505 to a linear feed motor 2511 that is configured to translate mandrels 2505 to an angular drive 2513. Angular drive 2513 is configured to rotate mandrels at a rate controlled by controller 2507. Further, angular drive 2513 is configured to align the geometric shapes of back to back mandrels as well as assure that a front surface of aft mandrel is butted up near the rear surface of a forward mandrel in a repeating process.

As each mandrel 2505 exits angular drive 2513, a material feed head 2515 distributes units 2527a-2527d of composite material from material dispensers 2517 at a prescribed angle and material spacing. In illustrated embodiment, each unit 2527a-2527d can represent a wide variety of composite material forms. For example, each unit 2527a-2527d can be a continuous, resin-impregnated fiber 1401, as described with regard to FIG. 14. In another example, each unit 2527a-2527d can be a continuous, resin-impregnated tow 1501 of approximately 1000 fibers, as described with regard to FIG. 15. In another example, each unit 2527a-2527d can be a pre-cut tape of fibers may be referred to as a "slit-tape" having a prescribed width, such as ⅛" and ¼", to name a few.

During operation, controller 2507 can selectively change the feed angle A1 by moving material feed head 2515 to the desired feed angle A1. Further, controller 2507 can selectively change the axial speed and rotational speed for which linear feed motor 2511 and angular drive 2513 deliver each mandrel 2505 to the area that composite material is wrapped around each mandrel 2505 in a back to back linearly moving process. Further, since material feed head 2515 can selectively adjust the spacing between each unit 2527a-2527d, system 2501 can be selectively configured to wrap mandrels 2505 with composite material at a wide variety of material spacing and orientations depending upon the desired configuration of core 101.

Figure 26:
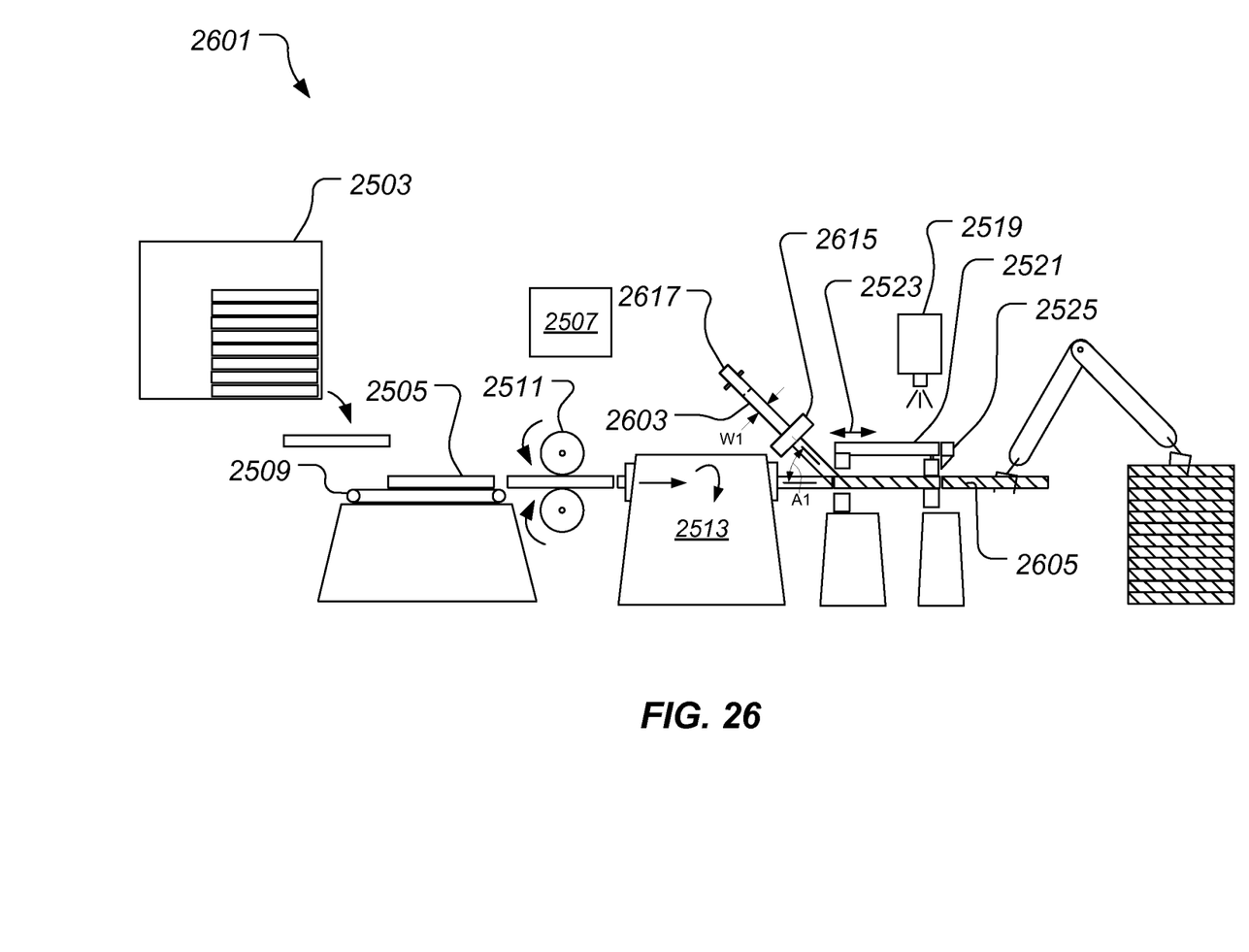
FIG. 26 is a schematic view of system for wrapping mandrels for the production of composite core, according to one example embodiment.

Referring briefly also to FIG. 26, a system 2601 is another example embodiment of system 2501. System 2601 is substantially similar to system 2501, except as noted herein. System 2601 is configured for wrapping each mandrel 2505 with a broadgood 2603 of the composite material in such a procedure that results in solid passageway or "closed cell" geometry of core 101. Namely, the broadgood 2603 of the composite material has a width W1 that is selected to prevent a gap or space between the broadgood 2603 as wrapped around mandrel 2505. Further, as broadgood 2603 is wrapped around mandrel 2505, a continuous seam 2605 is formed; however, seam 2605 is not a gap or space in the material, rather seam 2605 represents an abutment of helically wrapped broadgood 2603, which has a customized width W1. In contrast, the wrapping of a mandrel with composite material that produces a gap or space in the material, or an "open cell" geometry, as described with regard to FIGS. 14 and 15, can have undesirable attributes in certain implementations. For example, the "open cell" embodiment may be limited by the widths of the tows or slits having to be consistent, resulting in having only a fixed whole number of uniform width tows for a given spacing and angle, and the gaps having to be a uniform width. The result is only having a fixed whole number of materials for a given spacing and angle. The angle with which the tow or slit is wrapped may not be varied infinitely and still retain a specific tow or slit count, width, and spacing. Furthermore, an "open cell" geometry core can be undesirable in some panel implementations because of insufficient adhesive bond surface area at the core/skin interface. Further, for a given mandrel geometry there are a limited number of tow or slit width and gap combinations that will satisfy construction of the core tube for a given wrap angle.

Still referring to FIG. 26, a nominal width W1 of broadgood 2603 can be calculated by multiplying the circumference of the exterior surface of mandrel 2505 by the cosine of the wrap angle A1. One potential advantage of using broadgood 2603 to wrap mandrel 2505 without material gaps is that the angle A1 can be customized for the core implementation while simply adjusting for the width W1 of broadgood 2603. Furthermore, the broadgood 2603 can be cut off from a much wider roll of bulk raw material, such that the customization of width W1 can be simply a matter of adjusting the cutting tool to provide the implementation specific width. Customizing the angle A1 allows a user to tailor the physical properties of the core by orienting the fibers in a direction to produce said physical properties. Broadgood 2603 can be pulled off a material roll 2617. In one embodiment, the composite material on roll 2607 has been previously cut to the desired width W1 of broadgood 2603. In another embodiment, a cutter cuts the composite material to the desired width W1 prior to a material feed head 2615 directing broadgood 2603 at a prescribed angle as the rotation of mandrel 2505 pulls broadgood 2603 in tension.

The "closed cell" geometry core produced by wrapping broadgood composite material with system 2601 enables the use of much thinner and lighter composite material, thereby producing a core with very low density. Further, the "closed cell" geometry core can have significantly higher stiffness and strength than is achievable with "open cell" geometry core. Furthermore, "closed cell" geometry core is fully tailorable.

System 2601 can also be configured to wrap 2505 multiple times to produce multiple layers of composite material layers. In such an embodiment, the fiber orientation, wrap angle, and/or wrapping direction can be varied to produce tailored mechanical and physical properties.

During operation, controller 2507 can selectively change the feed angle A1 by moving material feed head 2615 to the desired feed angle A1. Further, controller 2507 can selectively change the axial speed and rotational speed for which linear feed motor 2511 and angular drive 2513 deliver each mandrel 2505 to the area that broadgood 2603 is wrapped around each mandrel 2505 so that the continuous seam 2605 represents an abutment of helically wrapped broadgood 2603, which has a customized width W1, so that a gap or space between adjacent portions of helically wrapped broadgood 2603 does not exist.

Referring again to FIG. 25, system 2501 can further include a compactor 2521 that is configured to press or compact the composite material so that the composite material doesn't unravel after the composite material is cut. During operation, compactor 2523 can includes pads that travel in a direction 2523 and rotate at the same speed of mandrel 2505. When a mandrel 2505 is wrapped with composite material, the pads of compactor 2523 can press against the external surfaces near the aft and forward portion to compact the uncured composite material at those portions. The compactor 2523 then moves back to align with the next wrapped mandrel. In one embodiment, the forward pads compact while supporting the mandrel by rotating and translating the mandrel while the aft portion of mandrel is being wrapped. Then after the aft portion is completely wrapped, the aft pads compact the aft portion of the wrapped mandrel. Afterwards, a cutter 2525 cuts the composite material between adjacent mandrels 2505. It should be appreciated that one or more support devices can be used to support one or wrapped mandrels prior to the cutting the composite material.

It should be appreciated that cutter 2525 can take on a wide variety of configurations. For example, cutter can be a sharp edge or a laser, to name a couple of embodiments. In another embodiment, cutter 2525 also cuts the mandrel 2505 into smaller mandrels.

As an alternative to compactor 2521, a banding device can be used to wrap a band of material around each end portion of the wrapped composite material, the band of material acting to prevent the composite material from unraveling after the composite material is cut.

After the composite material is cut by cutter 2525, a stacker device 2527 can translate each wrapped mandrel to a desired location. In one embodiment, stacker device 2527 stacks each wrapped mandrel with other wrapped mandrels in a tool so that the plurality of wrapped mandrels can be cured to form composite core, such as core 101. In another embodiment, stacker device 2527 transports the wrapped mandrel for an additional wrapping step. In such an embodiment, the wrapped mandrel is reversed so that the subsequent wrapping applies composite material in an opposite direction from the first wrapping. In another embodiment, stacker device 2527 transports the wrapped mandrel for bagging and storage in a controlled environment so that the wrapped mandrel can be cured at a later desired time. In another embodiment, stacker device 2527 transports the wrapped mandrel for curing of the composite material without the composite material being in contact with another wrapped mandrel. In such an embodiment, the cured single tube member can be later bonded with an adhesive to another cured tube member, for example.

System 2501 can also include an imaging machine 2519 that is configured to provide a quality control image that can detect a defect in the wrapped composite material. Imaging machine 2519 can be in communication with stacker 2527 so that the defective wrapped mandrel can be removed and segregated.

Figure 27:
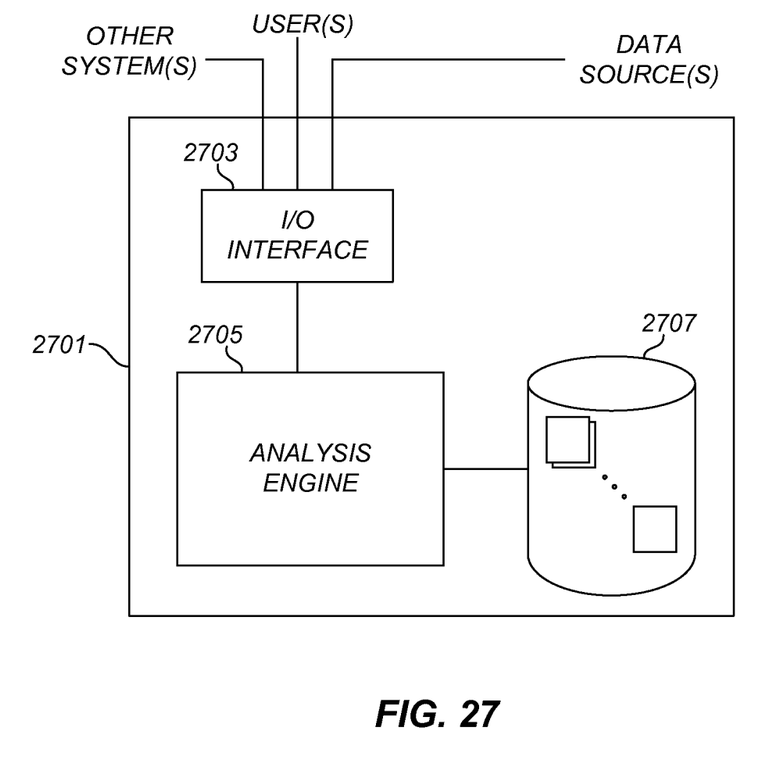
FIG. 27 is a schematic view of a computer system, according to example embodiment.

Referring now also to FIG. 27, a computer system 2701 is schematically illustrated. System 2701 is configured for performing one or more functions with regard to the operation of systems 2501 and 2601. Further, any processing and analysis can be partly or fully performed by computer system 2701. Computer system 2701 can be partly or fully integrated with other computer systems. In one example, computer system 2701 is an embodiment of controller 2507.

The system 2701 can include an input/output (I/O) interface 2703, an analysis engine 2705, and a database 2707. Alternative embodiments can combine or distribute the input/output (I/O) interface 2703, analysis engine 2705, and database 2707, as desired. Embodiments of the system 2701 can include one or more computers that include one or more processors and memories configured for performing tasks described herein. This can include, for example, a computer having a central processing unit (CPU) and non-volatile memory that stores software instructions for instructing the CPU to perform at least some of the tasks described herein. This can also include, for example, two or more computers that are in communication via a computer network, where one or more of the computers include a CPU and non-volatile memory, and one or more of the computer's non-volatile memory stores software instructions for instructing any of the CPU(s) to perform any of the tasks described herein. Thus, while the exemplary embodiment is described in terms of a discrete machine, it should be appreciated that this description is non-limiting, and that the present description applies equally to numerous other arrangements involving one or more machines performing tasks distributed in any way among the one or more machines. It should also be appreciated that such machines need not be dedicated to performing tasks described herein, but instead can be multi-purpose machines, for example computer workstations, that are suitable for also performing other tasks.

The I/O interface 2703 can provide a communication link between external users, systems, and data sources and components of the system 2701. The I/O interface 2703 can be configured for allowing one or more users to input information to the system 2701 via any known input device. Examples can include a keyboard, mouse, touch screen, and/or any other desired input device. The I/O interface 2703 can be configured for allowing one or more users to receive information output from the system 2701 via any known output device. Examples can include a display monitor, a printer, and/or any other desired output device. The I/O interface 2703 can be configured for allowing other systems to communicate with the system 2701. For example, the I/O interface 2703 can allow one or more remote computer(s) to access information, input information, and/or remotely instruct the system 2701 to perform one or more of the tasks described herein. The I/O interface 2703 can be configured for allowing communication with one or more remote data sources. For example, the I/O interface 2703 can allow one or more remote data source(s) to access information, input information, and/or remotely instruct the system 2701 to perform one or more of the tasks described herein.

The database 2707 provides persistent data storage for system 2701. While the term "database" is primarily used, a memory or other suitable data storage arrangement may provide the functionality of the database 2707. In alternative embodiments, the database 2707 can be integral to or separate from the system 2701 and can operate on one or more computers. The database 2707 preferably provides non-volatile data storage for any information suitable to support the operation of systems 2501 and 2601, including various types of data. The analysis engine 2705 can include various combinations of one or more processors, memories, and software components.

The particular embodiments disclosed herein are illustrative only, as the systems and operations may be modified and practiced in different but equivalent manners apparent to those skilled in the art having the benefit of the teachings herein. Modifications, additions, or omissions may be made to the system 2701 described herein without departing from the scope of the disclosure. The components of the system 2701 may be integrated or separated. Moreover, the operations of the system 2701 may be performed by more, fewer, or other components.

Furthermore, no limitations are intended to the details of construction or design herein shown, other than as described in the claims below. It is therefore evident that the particular embodiments disclosed above may be altered or modified and all such variations are considered within the scope and spirit of the disclosure. Accordingly, the protection sought herein is as set forth in the claims below.

To aid the Patent Office, and any readers of any patent issued on this application in interpreting the claims appended hereto, applicants wish to note that they do not intend any of the appended claims to invoke paragraph 6 of 35 U.S.C. §112 as it exists on the date of filing hereof unless the words "means for" or "step for" are explicitly used in the particular claim.

The invention claimed is:

1. A method of wrapping a plurality of mandrels with a composite material, the method comprising:
   rotating each mandrel at a rotational speed;
   translating each mandrel at a translational speed;
   positioning each mandrel back to back such that an aft face of a preceding mandrel is approximate to a forward face of a trailing mandrel;
   sequentially wrapping each mandrel with the composite material in a helical orientation by selectively positioning a feed head at a wrap angle relative to a translation axis of the plurality of mandrels;
   compacting the composite material of each mandrel via a compactor that includes pads that travel in an axial direction of the mandrel and rotate at the same speed as the mandrel, the pads of the compactor pressing against external surfaces of the composite material near aft and forward portions of the mandrel prior to a cutting of the composite material in order to prevent the composite material from unraveling; and
   moving the compactor back to align with the next wrapped mandrel.

2. The method according to claim 1, wherein each mandrel has a hexagonal shape.

3. The method according to claim 1, further comprising:
   banding the composite material near end portions of each mandrel prior to a cutting of the composite material in order to prevent the composite material from unraveling.

4. The method according to claim 1, further comprising:
   stacking each wrapped mandrel.

5. The method according to claim 1, further comprising cutting the composite material with a laser cutter.

6. The method according to claim 1, further comprising cutting the composite material with a mechanical cutter.

7. The method according to claim 1, wherein the step of sequentially wrapping each mandrel with the composite material in the helical orientation includes pulling off the composite material from the feed head by the rotation and translation of each mandrel.

8. The method according to claim 1, wherein the composite material is a broadgood having a specific width so that each mandrel is wrapped without gaps between adjacent edges of the helically wrapped broadgood.

9. The method according to claim 1, wherein the composite material is a tow of fibers.

10. The method according to claim 1, wherein the composite material is a slit tape of composite material.

11. The method according to claim 1, wherein the composite material is a combination of fibers and uncured resin.

\* \* \* \* \*